United States Patent [19]

Friedrich et al.

[11] Patent Number: 5,373,545
[45] Date of Patent: Dec. 13, 1994

[54] METHOD FOR THE ON-LINE NONDESTRUCTIVE MEASUREMENT OF A CHARACTERISTIC OF A CONTINUOUSLY PRODUCED

[75] Inventors: Marc Friedrich, Metz Vallieres; Jean-Jacques Marez, Hayange; Jean-Lou Lebrun, Palaiseau; Hervé Pierre Michaud, Saint Etienne, all of France

[73] Assignee: Sollac, Puteaux, France

[21] Appl. No.: 834,875

[22] Filed: Feb. 13, 1992

[30] Foreign Application Priority Data

Feb. 19, 1991 [FR] France .................. 91 01958

[51] Int. Cl.$^5$ ........................... G01N 23/20
[52] U.S. Cl. ......................... 378/72; 364/472; 364/507
[58] Field of Search ............. 378/50, 54, 58, 72, 378/86, 89; 73/37.7, 826, 828, 829; 364/469, 470, 471, 472, 507

[56] References Cited

U.S. PATENT DOCUMENTS

| 3,869,892 | 3/1975 | Higham et al. .................. 72/9 |
| 3,956,631 | 5/1976 | Crosby, Jr. ..................... 250/321 |
| 4,073,007 | 2/1978 | Boivin ........................... 364/508 |
| 5,308,010 | 5/1994 | Hakiel ........................... 242/75.3 |

FOREIGN PATENT DOCUMENTS

| 0145547 | 6/1985 | European Pat. Off. . |
| 2464106 | 3/1981 | France . |
| 2036334 | 1/1972 | Germany . |
| 2434151 | 2/1976 | Germany . |
| 1474462 | 4/1989 | U.S.S.R. ........................ 378/72 |

OTHER PUBLICATIONS

Patent Abstracts of Japan, vol. 5, No. 21 (P-48) [693], Feb. 7, 1981, & JP-A 55-149031, Nov. 20, 1980, S. Shida, et al., "Shape Detecting Method of Rolled Plate".

Materiaux Et Techniques, Sep.-Oct. 1988, Paris, FR, pp. 5-12, G. Maeder, "Developpements Actuels De La Determination Des Contraintes Par Diffraction Des Rayons X".

Primary Examiner—Paul M. Dzierzynski
Assistant Examiner—David V. Bruce
Attorney, Agent, or Firm—Oblon, Spivak, McClelland, Maier & Neustadt

[57] ABSTRACT

The process measures a characteristic (X) which is difficult to measure of a continuously produced product and comprises:

choosing at least one easily measurable second characteristic (Y) whose variations are correlated to the variations of the first characteristic;

modifying, by means acting on the product in a given zone of the production line, the first characteristic so as to put it into a known predetermined reference state ($X_o$);

taking at least in said zone a measurement of the second characteristic, and;

processing said measurement for determining a variation in the first characteristic relative to the reference state (X).

Application in the measurement of the flatness of a strip continuously travelling through a levelling machine.
FIG. 2.

17 Claims, 7 Drawing Sheets

METHOD FOR THE ON-LINE NONDESTRUCTIVE MEASUREMENT OF A CHARACTERISTIC OF A CONTINUOUSLY PRODUCED

FIELD OF THE INVENTION

The present invention relates to the continuous production of a moving product in the form of a strip, sheet, section, wire or the like, such as metallurgical products.

It more particularly concerns the nondestructive rapid detection or measurement of a characteristic which is difficult to measure in a continuous manner of such a product in the course of its production to permit carrying out a quality control or inspection or regulating the production process so as to inspect the characteristic which is difficult to measure.

BACKGROUND OF THE INVENTION

In the course of the production of such products, it is necessary to measure for the purpose of an inspection or a regulation, characteristics which are difficult to measure in a continuous manner. This is in particular the case of characteristics such as the flatness or the yield strength for example. Usually, for the purpose of measuring these characteristics, a person skilled in the art has to take samples from the product and effect measurements which are remote from the production line and are therefore differed measurements. This manner of proceding presents several drawbacks among which are:

it is necessary to take a sample and therefore to cut off this sample, which may interrupt the continuous character of the production;

it is impossible to achieve a continuous regulation.

DETAILED DESCRIPTION OF THE PREFERRED EMBODIMENTS

An object of the invention is to overcome these drawbacks by permitting a nondestructive and rapid measurement in a production line of a characteristic which is difficult to measure in a continuous manner of a product produced continuously in the form of a strip, sheet, section, wire or the like, such as a metallurgical product.

The invention is characterized in that it comprises:

choosing a second physical or geometrical characteristic of the product which is easily measurable and whose variations are, in a known manner, correlated to those of said first characteristic;

modifying, by a means acting on the product in a given zone of the production line, said first characteristic so as to put it into a known predetermined reference state;

taking in said zone a first measurement of said second characteristic and, as the case may be, either before or after said zone, a second measurement of said second characteristic;

processing said first and second measurements so as to determine a variation in said first characteristic relative to said reference state, which permits determining said first characteristic either before or after said zone, depending on whether said second measurement was taken before or after said zone.

When the continuously measurable second characteristic has itself a known per se value either before or after said zone, the measurements of said second characteristic either before or after said zone are no longer necessary and the method can be carried out by taking only one measurement of said second characteristic in said zone.

According to another feature of the invention, two measurements of said second characteristic are taken at two different points of said zone and, possibly, at two different points located either before or after said zone, the measuring points located in said zone and located outside said zone being such that, in the movement of the product, the measurements located in said zone and outside said zone can be associated. In the case of a strip, these points may be, on one hand, points located on the axis of movement of the strip and, on the other hand, points located on a line parallel to but offset from said axis.

The invention therefore permits a continuous inspection of a product at the exit of a continuous treatment process, so as to inspect a physical characteristic of said product.

The invention also permits a regulation of a characteristic of a product in the form of a strip, sheet, section, wire or the like produced in a continuous treatment installation.

The invention is applicable in particular but not exclusively to the inspection and/or the regulation of the overall flatness of a rolled product, such as a steel strip which has been subjected to a levelling operation in a levelling machine. In this case, the second characteristic is advantageously at least a surface stress in at least one zone of said strip and, by means of this measurement, there are determined the values representing the defect in the flatness (bends and/or buckles or tiles) that the product would have in the absence of tension.

According to a preferred embodiment, the surface stress of the product is determined by the measurement of a characteristic magnitude of the diffraction of X-rays representing the stress.

According to this embodiment, the Bragg angle on the two faces of the product is measured and a differential value of the Bragg angle is determined.

The invention also provides a device for carrying out the aforementioned method characterized in that it comprises a Sollers slit detector for measuring the stress.

In a second device, linear X-ray detectors are used for measuring the Bragg angle.

The invention also provides a method for correcting the measurement so as to take into account the displacements of the product in the course of said measurement.

BRIEF DESCRIPTION OF THE DRAWINGS

A better understanding of the invention will be had from the following description which is given solely by way of examples with reference to the accompanying drawings in which:

With reference to FIG. 1, there is considered a process for the continuous production of a product travelling from the left to the right.

At point A, the product leaves the continuous production process with a first characteristic X having a value which it is desired to inspect but which is not continuously measurable; it also leaves said continuous production process with a second characteristic Y having a continuously measurable value.

On the downstream side of point A, by bringing into action a process which is mechanical, thermic, magnetic, electric or of any other type and which simultaneously acts on the characteristics X and Y, the product is put into a reference state which is such that, at point B, the first characteristic has a value $X_o$ known per se and the second characteristic has a measurable value $Y_o$.

On the downstream side of this process, the product becomes again "free" and the first characteristic returns to a value X' and the second characteristic has a value Y'.

Figure 1:
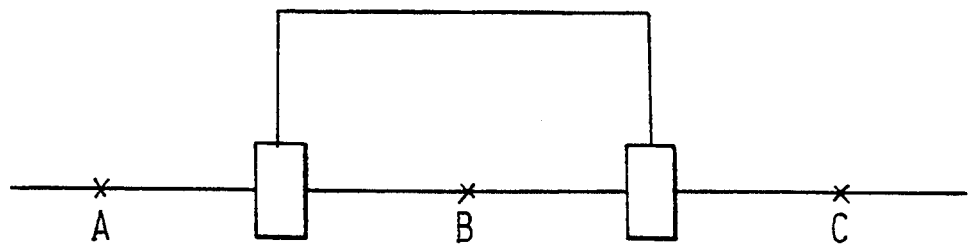
FIGS. 1 and 2 are diagrams explaining the general principle of the invention.
Figure 2:
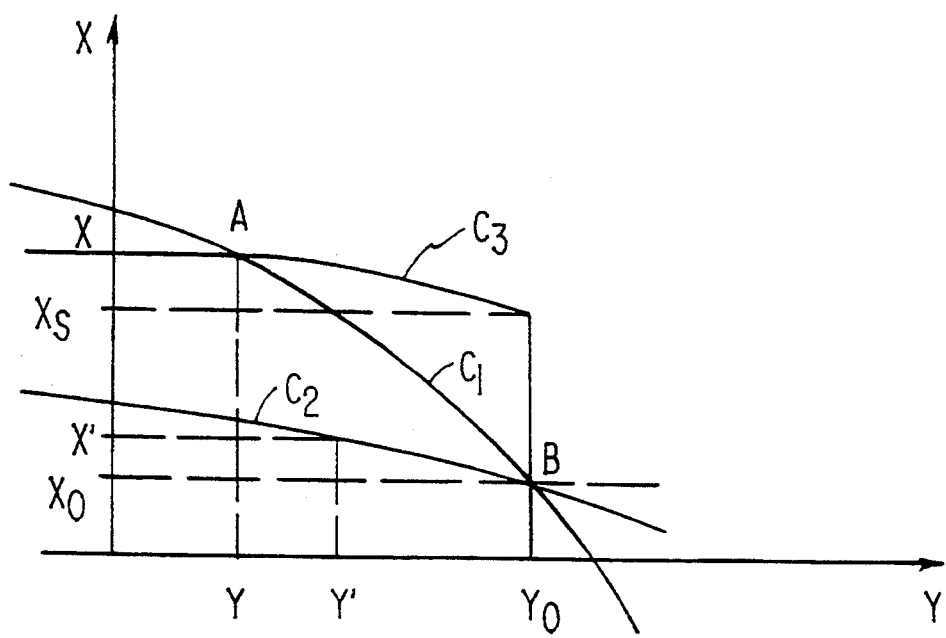

As shown in FIG. 2, the first and second characteristics are correlated to each other when the process is brought into action. Three cases have been shown. The curve C1 corresponds to a reversible process; X varies with Y in a regular manner.

The curve C3 corresponds to a process presenting a saturation effect and the curve has a vertical part when the process has brought X to a value $X_S$. Threshold processes also exist in which the curve X=f(Y) presents first of all a horizontal part and then a part in which X varies with Y. Such processs may be employed within the framework of the present invention.

The curve C2 corresponds to the behaviour of the product at the exit of the process. This curve is identical to the curve C1 when there is no irreversibility but corresponds for example to the non-vertical part of the curve C3 when the process is partly irreversible, which leads to a saturation effect. An example of such curves corresponds to the phenomenon of the levelling of bent sheets. If X corresponds to the deflection and Y to the difference between the stresses between the upper and lower faces on the axis of these sheets (or strips) and if, moreover, the process consists in crushing the sheet for eliminating the bend, two cases may arise:

if the initial deflection is small, the crushing will only lead to elastic deformations, the process will be reversible, and, for relating X and Y there may be used a curve of type C1 and the curve of type C2 will be identical to the curve of type C1;

if the initial deflection is very large, there will be a plastic deformation and in passing from point A (before the process) to point B, X and Y will be related by a relation corresponding to the curve of type C3, in leaving the process, and passing from B to C, X and Y will be related by a curve of type C2 such as that shown in FIG. 2.

It can be seen from FIG. 2 that, as $X_o$ is known, if there is measured $Y_o$ and either Y (at A) or Y'0 (at C), it is possible to determine X (at A) if there is no saturation and in any case X' (at C).

Therefore with at least one measurement of the second characteristic in the zone of point B and at least one measurement of this second characteristic either before (at A) or after (at C), it is possible to determine the first value either at A or at C, and therefore at the exit of the production line.

Moreover, it is sufficient to know the second value at C to inspect the product or regulate the production line, since it is in fact the product as it will be on the downstream side of the process which will be produced.

Figure 3:
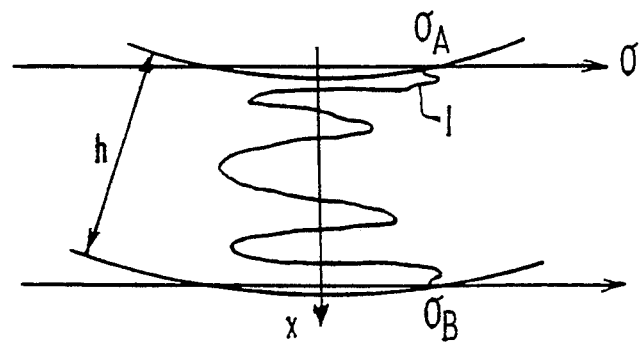
FIGS. 3 and 4 are diagrams explaining the invention in the application to the measurement of defects in the flatness of a sheet, the measurement being taken on the upstream side of a stretcher levelling machine.

FIG. 3 represents a portion of a steel sheet of thickness h after a stretcher levelling of the sheet, which is not subjected to any force or stress and which is therefore bent naturally with a curvature $\rho$. The curve 1 represents the variations in the stresses in the thickness.

With the sheet not subjected to any force:

the integral of the stresses in the thickness is zero (sum of the zero exterior traction forces)

$$\int \sigma dx = 0$$

the integral of the product of the stresses multiplied by the distance to one face, in the thickness is zero (zero moment)

$$\int \sigma x dx = 0$$

Figure 4:
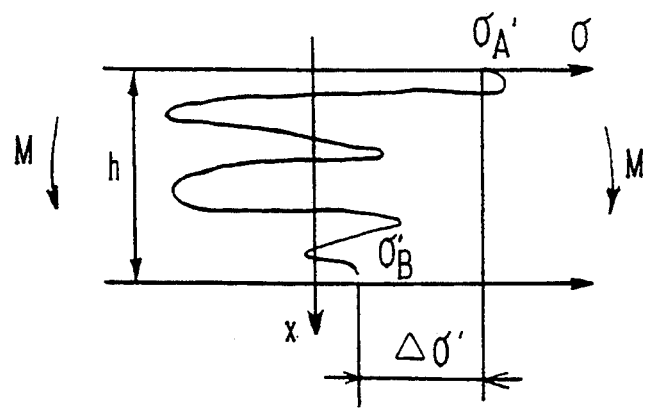

FIG. 4 represents the same specimen or sample which is subjected to a moment M so as render it flat. Under these conditions:

$$\int \sigma dx = 0 \text{ zero exterior traction forces}$$

$$\int \sigma x dx = M \text{ moment required for the flattening.}$$

If $\sigma_A$ and $\sigma_B$ are the surface stresses in the initial state (bent), and $\sigma'_A$ and $\sigma'_B$, the surface stresses in the final state (flattened), a simple calculation in mechanics shows that $(\sigma'_A - \sigma_A) - (\sigma'_B - \sigma_B)$ is proportional to the moment M and it is then possible to calculate the initial bend if there has been no plastification or, if there has been plastification, the residual elastic bend which will reappear when the flattening forces are released. We then have the most general case of the method described hereinbefore.

Figure 5:
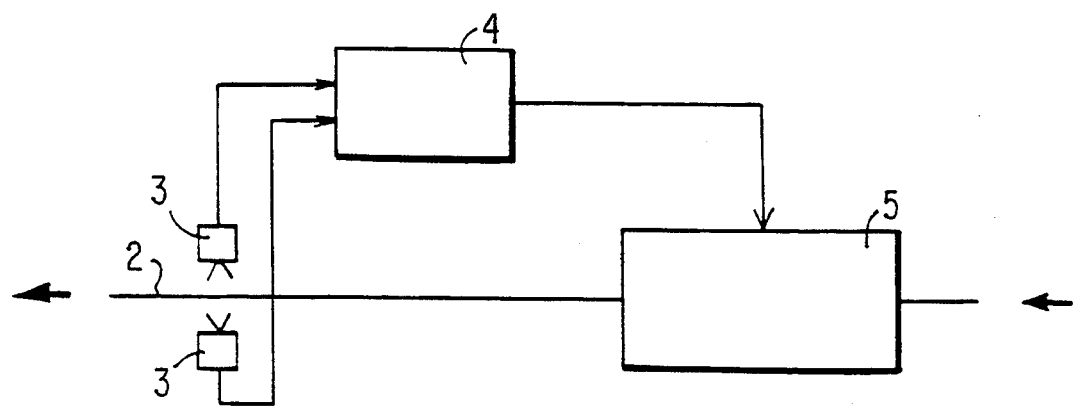
FIG. 5 is a simplified block diagram of a device according to the invention.

FIG. 5 shows diagrammatically a rolled sheet 2 travelling from the right to the left in the Figure in the direction indicated by the arrows. Upon travelling through a stretcher levelling machine 5, this sheet is maintained taut and travels in front of a device 3 for determining the surface stresses by measurement of the Bragg angles by diffraction of X-rays on each of its faces. The stress values measured by the measuring device 3 are fed to a computer or calculator 4 which calculates the values of the deformations in the form of bends or buckles or tiles the sheet 2 has when it is released, i.e. free from any exterior stress. These values are compared with predetermined values chosen by the user and defining a certain quality of flatness or of special sheets having the desired deformations. If the calculated values of the deformations do not correspond to the chosen criteria, the computer 4 produces regulating signals which are fed to the stretcher levelling machine 5 located on the upstream side relative to the direction of travel of the sheet so as to ensure that the sheet leaving this machine has been correctly treated.

The determination of the surface stresses $\sigma_A$, $\sigma_B$ on each face of the moving sheet or strip is effected by diffraction of X-rays in accordance with widely published basic principles, described for example in the article by G. Maeder "Present developments in the determination of stresses by X-ray diffraction" which appeared in the review "Materiaux and techniques" of September-October 1988, pages 5 to 12, the contents of which are included by reference in the present disclosure.

This method requires the study of the displacement and shape of a diffraction peak corresponding to a particular family of crystal planes. Different orientations with the frame of reference of the sheet or strip are to be taken into account along a common generatrix to obtain a stress value, or along a plurality of generatrices for a complete stretcher.

Figure 6:
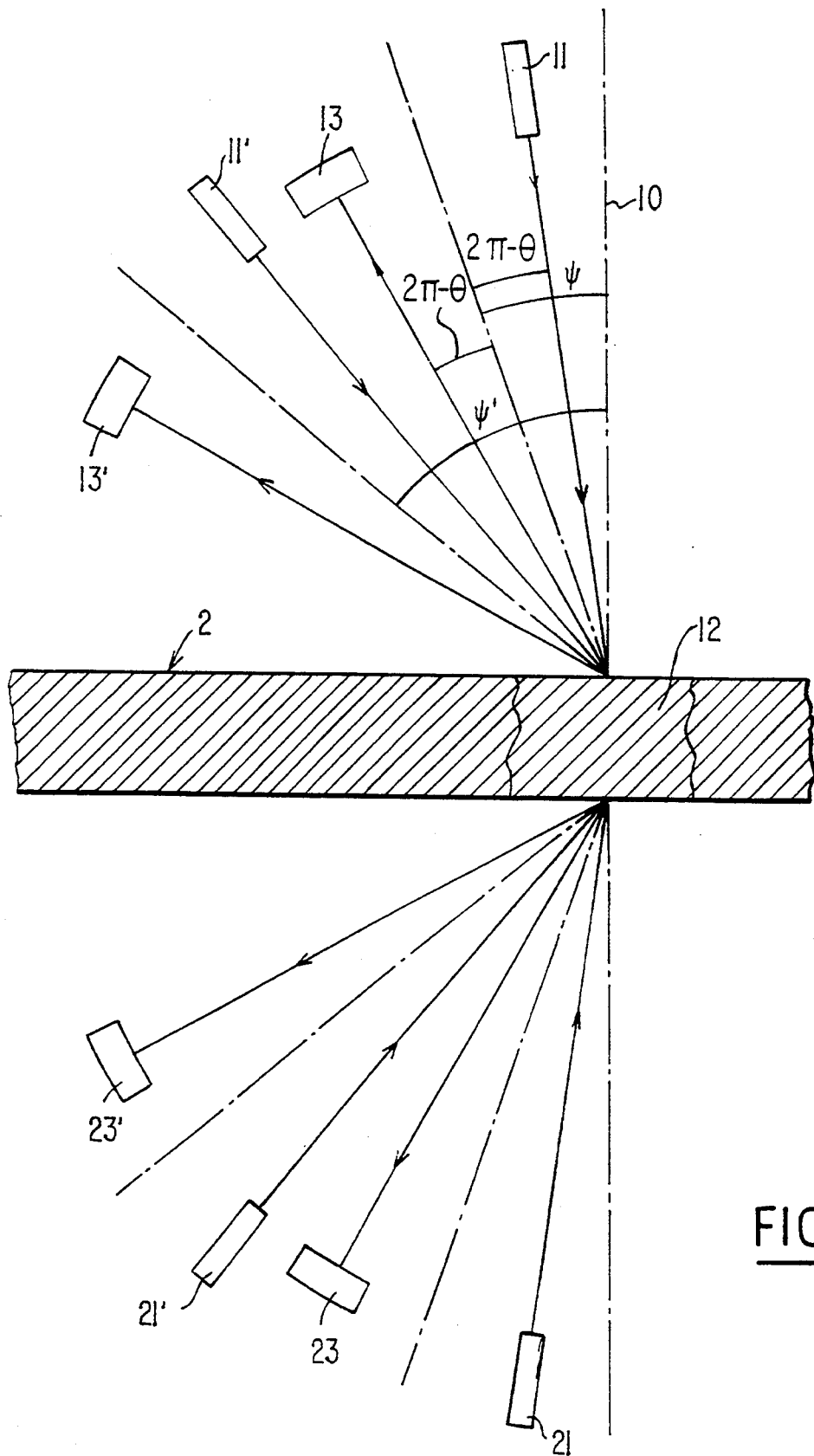
FIG. 6 is a detailed view of a measuring device.

FIG. 6 shows the measuring device 3 in detail. A source 11 of X-rays directs its beam onto a zone 12 of one of the faces of the sheet 2; the diffracted radiation is received by a detector 13 which is disposed at an orientation different from that of the source 11 with respect to the sheet 2, the axes of the source 11 and detector 13 making an angle equal to $\pi - 2\theta$. The orientation of the measuring unit constituted by the source 11 and the detector 13 with respect to the sheet 2 is equal to $\psi$, which is the angle made by the bisector of the angle between the axes of the source 11 and detector 13 with the normal to the sheet 10 at the point of incidence on the sheet of the radiation of the source 11. The value of the angular divergence $\psi - 2\theta$ is chosen in accordance with the crystal plane of the metal chosen as the gauge of the deformation. The value of the angle $\psi$ is determined by the measuring conditions.

According to a feature of the invention, for the purpose of obtaining a sufficient and rapid evaluation of the bend, the displacements of the Bragg angles and the intensities between the two faces are compared. This comparison may be effected with the devices 11', 13', 21' and 23' shown in FIG. 6.

According to another feature of the invention, the measurements are taken at a plurality of orientation angles.

In a first embodiment, this is achieved by employing a plurality of emitter-receiver units 11, 13 and 11', 13' operating with different orientation angles $\psi$ and $\psi'$. It is possible to deduce from these measurements, for each face, an evaluation of the stresses and microstructural states.

According to another embodiment, a single emitter-receiver unit is used mounted at an orientation which is variable with respect to the face of the product.

Advantageously, a symmetrical measurement is taken on the opposite face of the sheet 2 by means of pairs of emitters and detectors 21, 23, 21' and 23'.

These means permit the rapid acquisition of data exploited by more or less elaborated algorithms depending on the desired type of information. There must be provided at least:

for an immediate evaluation of the bend: simple comparison from one face to the other of the angular displacements and intensities measured in one or a plurality of orientations (a minima);

for a fine characterization of the surface deformation on each face: calculation of the stresses and description of the shape of the diffraction peaks in a plurality of orientations (obligatory).

In the case where a differential measurement is effected, i.e. where there are symmetrical measuring devices each measuring zones on the opposite faces of the sheet 2, a relation may be established relating the radius of curvature of the deformation, or its deflection F, to the differential value of the stresses existing between the two faces.

If a hypothesis is made of a symmetrical distribution of the initial stresses $\sigma_A = \sigma_B$, then the direct measurement $\Delta\sigma = \sigma'_A - \sigma'_B$ permits calculating the deflection by means of the relation:

$$F = \Delta\sigma \cdot L^2 / 8Eh.$$

in which $\Delta\sigma$ is expressed in Pa; L represents the length of the deformation in mm; E represents the modulus of elasticity in Pa, and h represents the thickness of the sheet in mm.

We here have the particular case of the general method in which the state before or after the process is known per se, and a single measuring zone is sufficient.

This then permits obtaining the radius of curvature $\rho$ in mm, $$\rho = \frac{E \cdot h}{\Delta\sigma}$$

It is possible to avoid the hypothesis of symmetry of the initial stresses by introducing before or after the flattening device, a second stress measuring device; this is the most general case.

If the initial bend is small, the flattening is a purely elastic and reversible process. We therefore have the case of the curve C1 of FIG. 2. The second measuring device may be placed before or after the flattening device.

If the initial bend is excessive, in the course of the flattening there is a plastic deformation and we have a process with saturation characterized by the curves of type C3 and C2 of FIG. 2. In this case, it is preferable to place the second measuring device after the flattening process and not before.

In this case, the deflection is $F = \Delta\sigma \cdot L^2 / 8$ E.h with $$\Delta\sigma = (\sigma'_A - \sigma'_B) - (\sigma_A - \sigma_B)$$

With these calculations, it is then possible to determine the regulations to be effected on the flattening machine 5 to obtain the desired flatness quality.

It is also possible to provide an additional stretcher levelling machine on the downstream side for correcting the overall defects in the flatness of the very sheet just inspected, the result of this corrective stretcher levelling machine varying as a function of the deviations measured by the measuring device 3.

Figure 7:
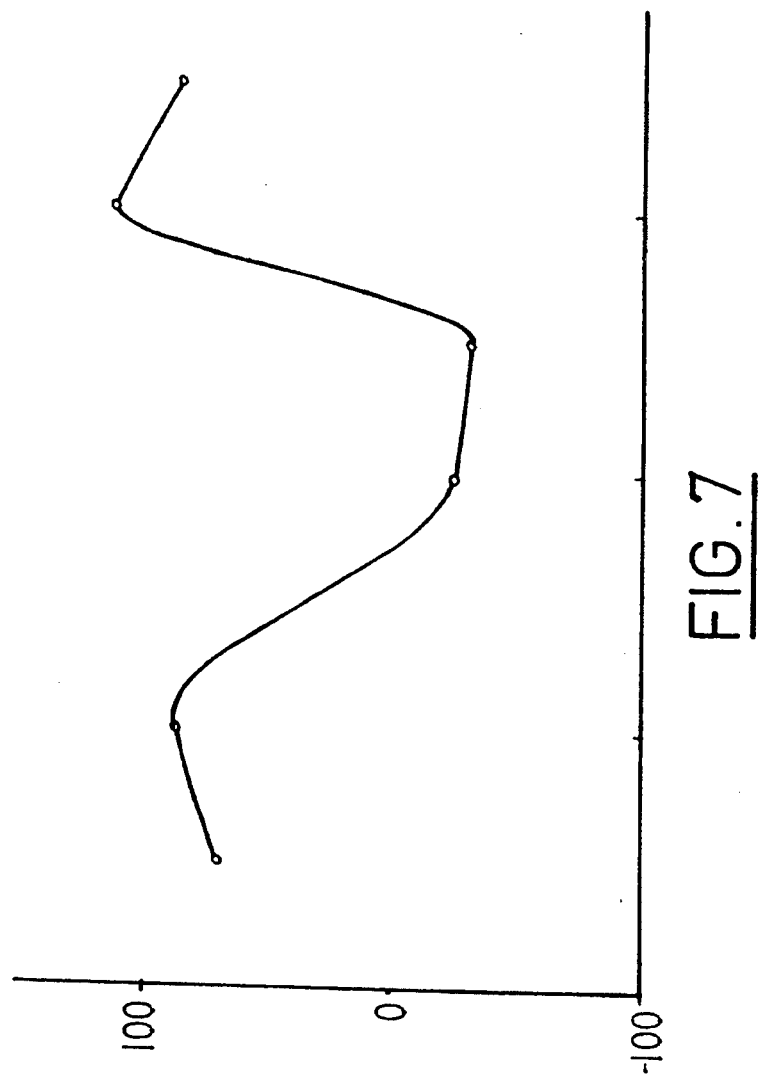
FIG. 7 is a curve representing the stress differential as a function of the value of the residual bend.

As can be seen in FIG. 7, which is a curve representing the value of the differential measurement of the stress on a sheet portion comprising a first positive bend of 3 cm then a negative bend of less than 5 cm followed by a positive bend of 3.5 cm, the differential measurement of the stress provides an image of the deformation of the sheet when it is not subjected to a tension. The bend measurements were indeed taken after cutting the sheet on the downstream side of the measuring device.

The detectors employed for measuring the stress may be for example formed by Sollers slit detectors of known type, such as those manufactured by the Japanese firm Rigaku. In these apparatuses, there is first of all detected a diffraction point providing a Bragg angle value which is employed for determining the stress.

Figure 8:
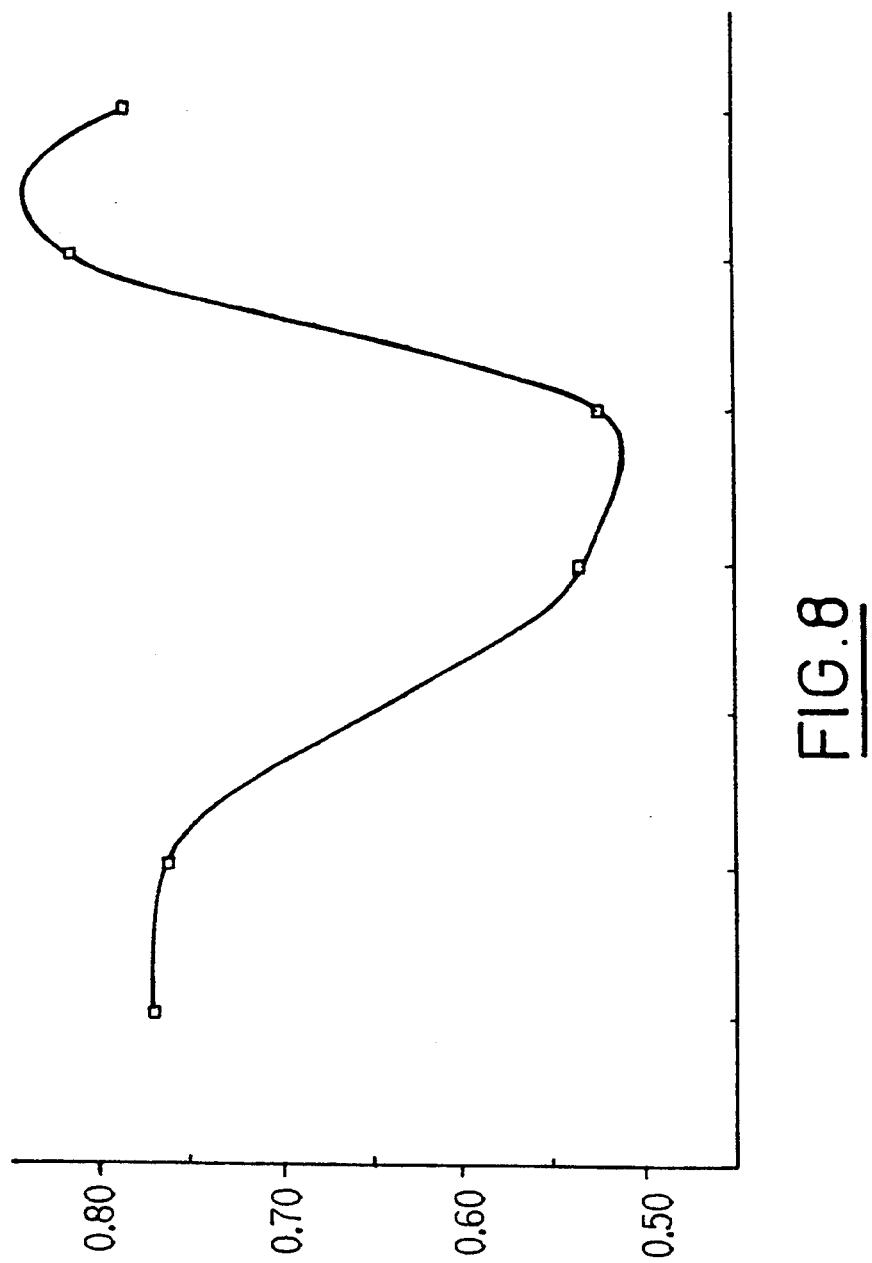
FIG. 8 is a curve representing the Bragg angle differential for the same bend values.

According to an alternative embodiment of the invention, the Bragg angle is directly measured as a second characteristic, and a differential measurement is also taken between the two faces of the sheet. As can be see in FIG. 8 which represents the differential measurement of the Bragg angle for the same sheet profile as that of FIG. 7, the value of the differential measurement of the Bragg angle also provides a measurement representing the defects in the flatness of the sheet.

Advantageously, the measurement of the Bragg angle is taken with an orientation angle of the measuring unit of between 35° and 60°, at which value the sensitivity of the differential measurement of the Bragg angle is particularly high and the diffraction intensity is great.

In order to improve the rapidity of the measurement, it is advantageous to employ a linear detector, for example a linear detector comprising 220 channels which define a diffraction peak in an angular range of 20°. Such a detector also permits improving the precision; thus for example a precision of 0.03° can be obtained on the position of the diffraction peak, the measurement being taken in ten seconds. This precision provides an evaluation of the bend to within 1.5 cm.

The differential measurement of the Bragg angle with such linear detectors is relatively sensitive to differences in the height of the sheet. There was for example taken a static measurement with vertical movements of 2 mn in amplitude and 3 Hz in frequency, which revealed a loss of precision of the order of 0.01°. In order to improve the precision of the measurement, the invention teaches measuring in real time the variations in the position of the sheet in the measuring zone and making a corresponding correction in the differential measurement of the Bragg angle which was measured.

Figure 9:
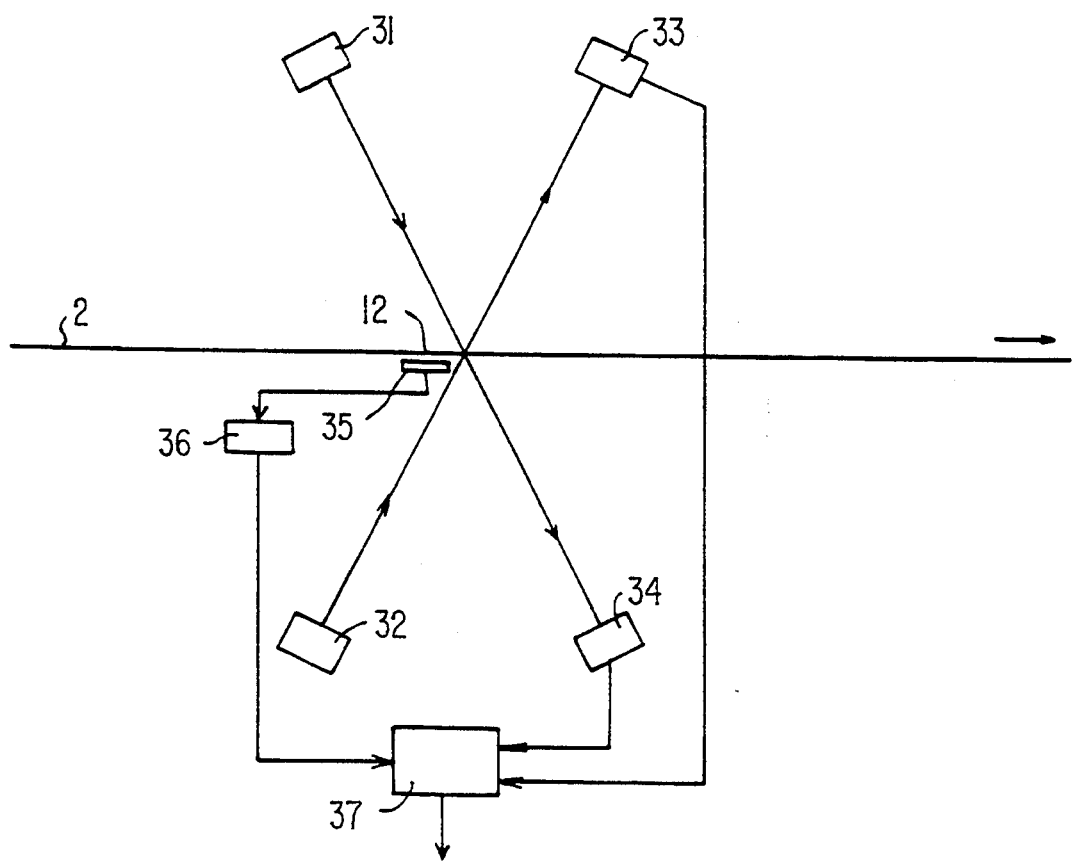
FIG. 9 is a diagram of a device for measuring the Bragg angle comprising a device for correcting the positions of the sheet.

FIG. 9 shows diagrammatically a device of this type; there are shown the sheet 2 and the two emitter-sensor units disposed on each face of the sheet, namely the two emitters 31 and 32 and the two linear sensors 33 and 34. According to the invention, there is disposed in the measuring zone 12 a device measuring the position of the sheet, constituted for example by a capacitive sensor 35 coupled with a measuring apparatus 36 delivering the value of the height of the sheet 2 with respect to a mean position. The measurements provided by the two sensors 33 and 34 and the measurement provided by the measuring device 36 are fed to a computer or calculator 37 which delivers at its output a corrected value of the differential value of the Bragg angle.

Figure 10:
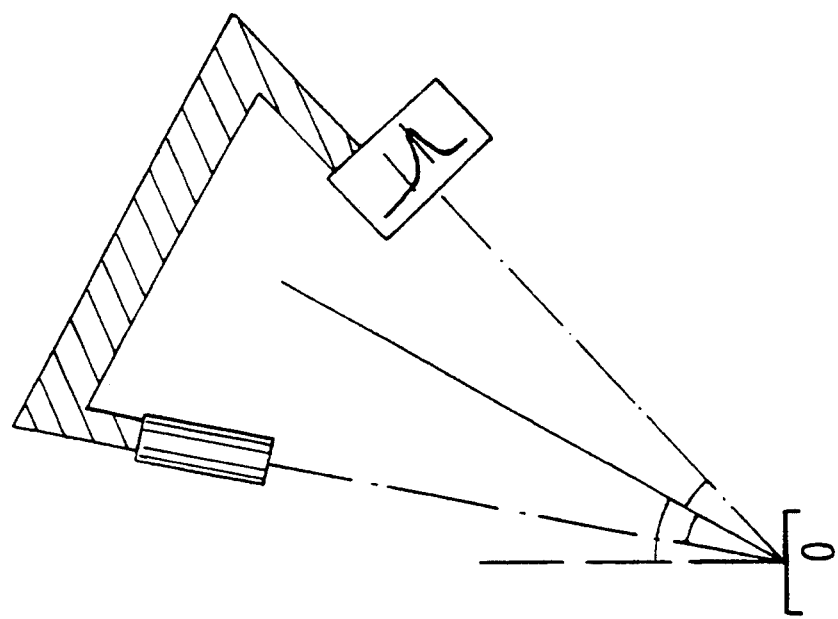
FIG. 10 is a schematic of a device employing a linear X-ray detector for evaluating stresses based on the measurement of the Bragg angle with an "omega" arrangement, for two incidence values $\psi$.
Figure 10:
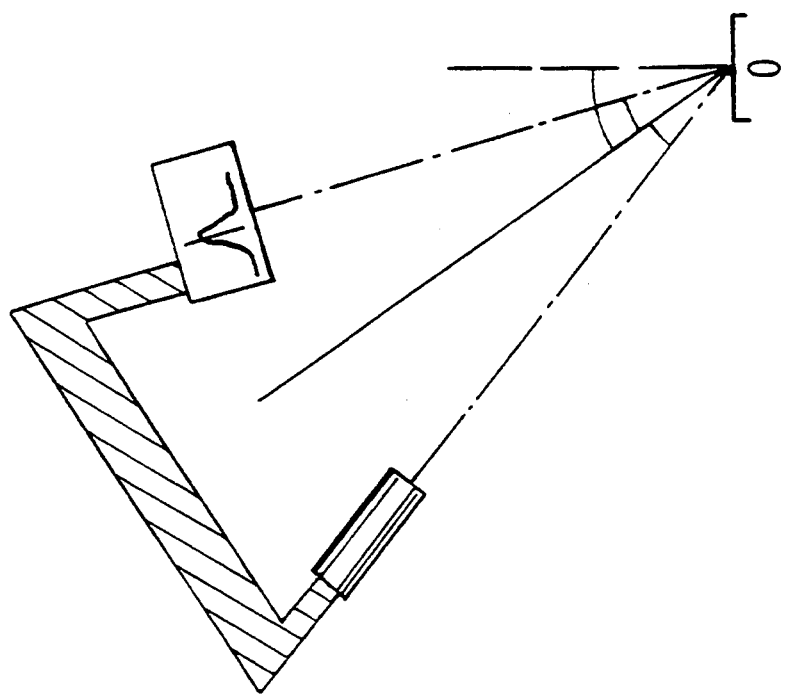

FIG. 10 is a schematic of an alternative embodiment of the invention employing linear detectors with an omega arrangement of the emitter-detector measuring units; such an arrangement permits, relative to the $\psi$ arrangement, dividing by 4 the sensitivity to the differences in height and integrating the differential measurement of the stresses in a greater thickness.

Further, as the sensitivity is inversely proportional to the distance of the sensors with respect to the sheet, by increasing the distance of the sensor relative to the sheet, it is possible to obtain a device which permits detecting an on-line variation in the bend of the order of 3 mm.

It can be seen that the invention permits inspecting in a simple manner the flatness of rolled products subjected to a stretcher levelling operation. This provides sheets which are either correctly planar or have predetermined curvature characteristics.

In particular, by employing fixed linear detectors, it is possible to achieve a sufficiently rapid response time for effecting a regulation.

What is claimed is:

1. Nondestructive method for on-production line measurement of the overall flatness of a metallurgical product, said method comprising:
choosing a second physical characteristic of the product which is easily measurable in a continuous manner and has variations which are, in a known manner, correlated to variations of said flatness;
modifying, by means acting on the product, in a given zone of said production line, said flatness so as to put it into a known predetermined reference state;
taking, in said zone, a first measurement of said second characteristic and taking out of said zone relative to the travel of the product in said production line, a second measurement of said second characteristic if said second characteristic does not have a value known per se outside said zone;
processing said first and second measurements so as to determine a variation in said flatness relative to said reference state, thereby permitting the determination of said flatness out of said zone.

2. Method according to claim 1, wherein said second characteristic has a value known per se out of said zone corresponding to said reference state of said first flatness said method comprising taking only a measurement of said second characteristic in said zone, and effecting said processing solely on said first measurement.

3. Method according to claim 1, comprising taking at least two measurements of said second characteristic at two different points of said measuring zone and effecting at least one processing on each of said two measurements.

4. Method according to claim 1, comprising taking at least two measurements of said second characteristic at two different points of said zone, subjecting each of said measurements to processing for characterizing the variation in said flatness.

5. Method for continuously inspecting a a metallurgical product issuing from a continuous treatment process in a production line, said method comprising determining a physical characteristic of said product by employing a nondestructive method for on-line, measurement of the overall flatness of the product, said nondestructive method comprising:
choosing a second physical characteristic of the product which is easily measurable in a continuous manner and has variations which are, in a known manner, correlated to variations of said flatness;
modifying, by means acting on the product, in a given zone of said production line, said flatness so as to put it into a known predetermined reference state;
taking, in said zone, a first measurement of said second characteristic and taking, out of said zone relative to the travel of the product in the production line, a second measurement of said second characteristic if said second characteristic does not have a value known per se outside said zone;
processing said first and second measurements so as to determine a variation in said flatness relative to said reference state, thereby permitting the determination of said flatness out of said zone.

6. Method for regulating a continuous treatment installation for a metallurgical product, for regulating a characteristic of the product and generating a control signal for regulating said continuous treatment installation, said method comprising continuously inspecting the product issuing from the continuous treatment installation and determining a physical characteristic of said product by employing a nondestructive method for on-line, measurement of the flatness of the product, said nondestructive method comprising:

choosing a second physical characteristic of the product which is easily measurable in a continuous manner and has variations which are, in a known manner, correlated to variations of said flatness;

modifying, by means acting on the product, in a given zone of said production line, said flatness so as to put it into a known predetermined reference state;

taking, in said zone, a first measurement of said second characteristic and taking, out of said zone relative to the travel of the product in the production line, a second measurement of said second characteristic if said second characteristic does not have a value known per se outside said zone;

processing said first and second measurements so as to determine a variation in said flatness relative to said reference state, thereby permitting the determination of said flatness out of said zone.

7. Method for regulating the overall flatness of a rolled product which has been subjected to a flattening operation, said method comprising measuring surface stresses of said product by applying a nondestructive method for on-line measurement of the overall flatness of the product produced continuously in a production line, said nondestructive method comprising:

choosing a second physical characteristic of the product which is easily measurable in a continuous manner and has variations which are, in a known manner, correlated to variations of said flatness;

modifying, by means acting on the product, in a given zone of said production line, said flatness so as to put it into a known predetermined reference state;

taking, in said zone, a first measurement of said second characteristic and taking out of said zone relative to the travel of the product in the production line, a second measurement of said second characteristic if said second characteristic does not have a value known per se outside said zone;

processing said first and second measurements so as to determine a variation in said flatness relative to said reference state, thereby permitting the determination of said flatness out of said zone, said characteristic which is easily measurable being the surface stresses, and the process for putting the product into said reference state being a flattening of the strip, and a value representing bends or buckles in the product being determined from said measurements.

8. Method according to claim 7, comprising taking said measurement on both faces of said rolled product in the same zone corresponding to said reference state of said flatness and determining a differential value of the stress.

9. Method according to claim 7, comprising taking said measurement in a plurality of angular orientations in the same zone corresponding to said reference state of said flatness.

10. Method according to claim 7, comprising determining the surface stresses by measuring at least one value significant of the diffraction of X-rays.

11. Method according to claim 10, comprising measuring the Bragg angle on both faces of the product and evaluating a differential value of the Bragg angle representing the differential of the stresses on said both faces.

12. Method according to claim 11, comprising measuring variations in the position of the rolled product in said zone and effecting a correction on the measured values of the Bragg angle for said both faces.

13. Device for carrying out a method for regulating the overall flatness of a rolled product which has been subjected to a flattening operation, said method comprising measuring surface stresses of said product by applying a nondestructive method for on-line measurement of the overall flatness of the product produced continuously in a production line, said nondestructive method comprising:

choosing a second physical characteristic of the product which is easily measurable in a continuous manner and has variations which are, in a known manner, correlated to variations of said flatness;

modifying, by means acting on the product, in a given zone of said production line, said flatness so as to put it into a known predetermined reference state;

taking, in said zone, a first measurement of said second characteristic and taking, out of said zone relative to the travel of the product in the production line, a second measurement of said second characteristic if said second characteristic does not have a value known per se outside said zone;

processing said first and second measurements so as to determine a variation in said flatness relative to said reference state, thereby permitting the determination of said flatness out of said zone, said characteristic which is easily measurable is the surface stresses, the process for putting the product into said reference state being a flattening of the strip, and a value representing bends or buckles in the product being determined from said measurements, said device comprising a Sollers slit detector for measuring the stresses.

14. Device according to claim 13, wherein said nondestructive method further comprises determining the surface stresses by measuring at least one value significant of the diffraction of X-rays, said device further comprising a linear X-ray detector for measuring the Bragg angle.

15. Device according to claim 14, comprising a unit including an X-ray source and a linear X-ray detector, said unit being mounted to have a variable orientation relative to a face of said product.

16. Device according to claim 15, comprising a plurality of source-detector units disposed in a fixed manner in different orientations.

17. A device as claimed in claim 13, wherein said rolled product is a steel strip or sheet.

* * * * *

UNITED STATES PATENT AND TRADEMARK OFFICE
CERTIFICATE OF CORRECTION

PATENT NO. : 5,373,545
DATED : December 13, 1994
INVENTOR(S) : Marc FRIEDRICH, et al.

It is certified that error appears in the above-indentified patent and that said Letters Patent is hereby corrected as shown below:

On the title page, Item [54], and Column 1, Lines 2-5, the title is listed incorrectly. It should read:

--METHOD FOR THE ON-LINE NONDESTRUCTIVE MEASUREMENT OF A CHARACTERISTIC OF A CONTINUOUSLY PRODUCED PRODUCT, AND ASSOCIATED DEVICE--

Signed and Sealed this

Twenty-first Day of March, 1995

*Attest:*

BRUCE LEHMAN

*Attesting Officer*  *Commissioner of Patents and Trademarks*